Nov. 18, 1969   G. A. RUSNAK   3,479,638
BEAMFORMING IN SEISMIC SURVEYING
Filed July 29, 1968   2 Sheets-Sheet 1

INVENTOR
GENE A. RUSNAK
BY
ATTORNEYS

1

3,479,638
BEAMFORMING IN SEISMIC SURVEYING
Gene A. Rusnak, Mountain View, Calif., assignor to the United States of America as represented by the Secretary of the Interior
Filed July 29, 1968, Ser. No. 748,394
Int. Cl. H04b 13/00
U.S. Cl. 340—7                              8 Claims

ABSTRACT OF THE DISCLOSURE

Signal strength and resolution in seismic surveying are enhanced while side reflections and energy requirements are reduced by employing a plurality of acoustic sources spaced at even half wave lengths of the desired frequency response.

---

This invention resulted from work done by the U.S. Geological Survey of the Department of the Interior, and the domestic title to the invention is in the Government.

Background of the invention

It is common practice to conduct seismic surveys both on land and in marine environments. In such surveys, a wave front is generated which is propagated through the subsurface strata. When such waves impinge upon a boundary of two media having different elastic properties, at least a portion of the wave energy is reflected back to the surface and is detected by instruments such as geophones.

Seismic waves are generated on land by such means as explosives or by dropping a weight upon the earth's surface. In marine surveys, it is conventional to create a pressure wave in the water by means of explosives, gas guns of various types, spark sources and vibrating diaphragms. A pressure wave so generated travels downwardly and causes a seismic wave as it enters the earth.

All of these wave generating devices have a common fault. All generate a wave front having a wide range of frequencies. Since it is usually desirable to have only a limited range of frequencies in the seismic wave transmitted into the earth, most of the energy generated by the source is wasted. Energy sources used to generate pressure waves in water also create an objectionable bubble pulse following the primary pulse. The amplitude of the bubble pulse and the delay between the primary pulse and the bubble pulse is erratic and unpredictable. Hence, it is difficult to differentiate between the bubble pulse and reflections from the primary pulse which in turn introduces ambiguities into the detected data.

A number of systems have been developed to concentrate more of the source energy within the desired frequency range, broadly about 20 to 200 Hz., and to minimize the energy or the effect of the bubble pulse. These systems generally utilize multiple, relatively low energy sources energized either simultaneously or sequentially. Such techniques are illustrated by U.S. Patents Nos. 3,-245,032 and 3,304,533.

The production of complex broad-band waves by any presently known method of gas, electrical or mechanical shock generator is a highly inefficient conversion; estimated to be on the order of 10–35 percent efficient. With such relatively low conversion values for generating an acoustic pulse, it is necessary to store and use large amounts of energy for high-acoustic level seismic profiling. The present invention demonstrates a technique which not only improves the energy conversion, but also shapes the acoustic pulse in a fashion which constrains the number of multiple wave forms usually generated by broad-band acoustic sources. The increase in efficiency of energy conversion is estimated to be as much as a factor of 4 or 5 times greater, for pattern shooting of the kind described, than can be realized with single source discharge techniques as used conventionally or in multiple sources spaced at close intervals to each other without attention to possible gains which might be attained by source-spacing defined by desired frequency response.

It has now been found that an array of energy sources spaced at distances of even half wave lengths of the desired frequency response provides a highly directional, reinforced wave front. This spacing relationship may be conveniently expressed by the equation $n\lambda/2$ where $\lambda$ is the wavelength of the desired frequency and $n$ is an integer. It is generally desirable to operate at one-half wavelength spacing, i.e., $n=1$, but $n$ may have any value from 1 to 4 or more.

Such spacing of acoustic sources results in constructive interference of selected frequencies of sound energy and may be considered somewhat analogous to wave-front diffraction phenomena as described by Huygens' principle in the treatment of light interference. For short-pulse sound sources, such as those conventionally used in seismic surveying, constructive interference applies only to the finite length of the signal. Thus, multiple sources geometrically represent a larger area pulsed wave front. Use of multiple sources also allows destructive interference of the bubble pulse associated with underwater acoustic sources by dispersive interaction of the train of pulses formed by collapse of gas bubbles formed by activation of the source.

Thus, it is an object of this invention to provide a more efficient, highly directional energy array for use in seismic surveying.

It is a further object of this invention to increase the signal resolution obtainable in seismic surveying while decreasing the energy required for the generation of seismic waves.

Detailed description of the invention

The invention will be more clearly understood from the following description of a preferred embodiment wherein reference is made to the accompanying drawings.

Figure 1:
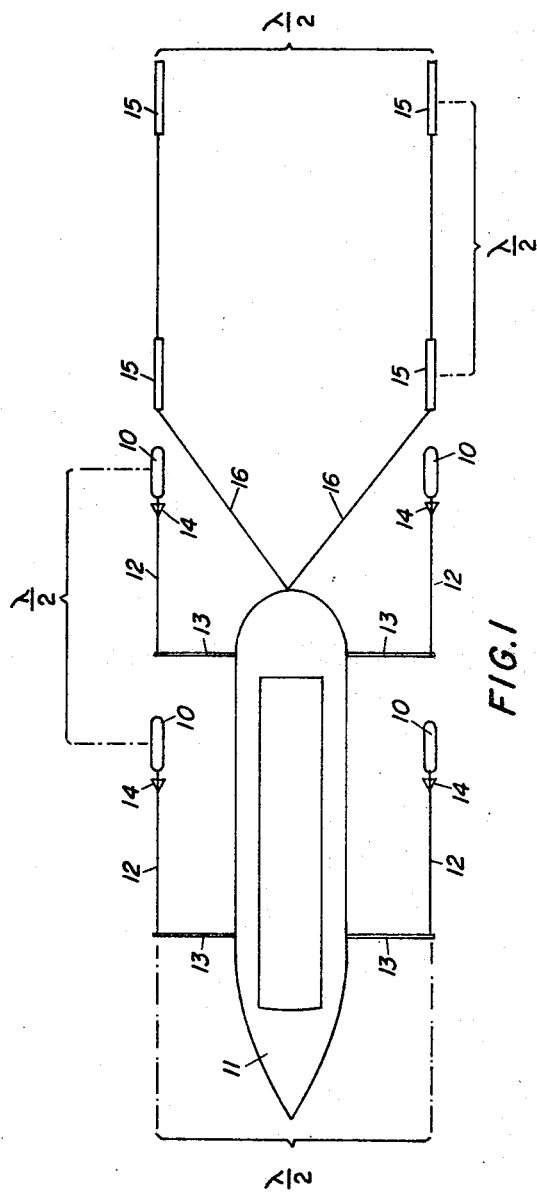
FIG. 1 is a schematic plan view of a system of the present invention in accordance with one embodiment thereof.
Figure 2:
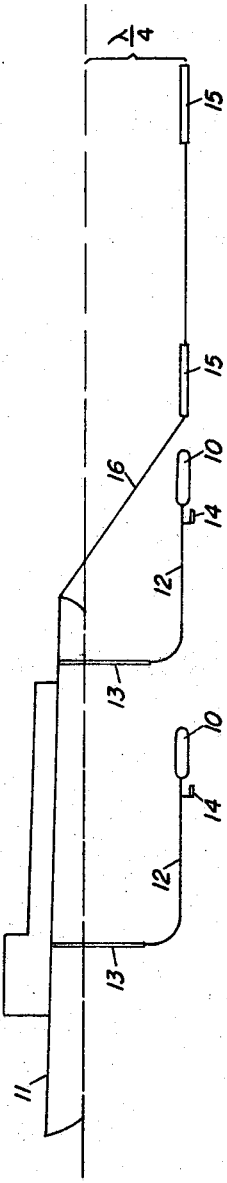
FIG. 2 is an elevational view of the system shown in FIG. 1.

Referring now to the drawings and more particularly to FIGS. 1 and 2, there is shown a group of acoustical signal generators suitable for generating seismic signals useful in marine geophysical prospecting and indicated generally by the numerals 10. Signal generators 10 may comprise any type of conventional device capable of being simultaneously activated but a spark discharge device such as that disclosed in the Kearsley et al. patent, No. 3,286,-226 has been found to be particularly useful.

Signal generators 10 are arranged in a planar array and are mutually spaced at distances of half-wave lengths of the desired frequency response. For example, if the desired frequency response were 50 cycles, then the signal generators would be mutually spaced at distances of 50, 100, 150, or 200 feet. It is usually most convenient to space the generators at distances of ½ wavelength and this is the preferred mode of operation. In marine seismic exploration, it is also preferred to operate the signal generators at a depth equal to one-fourth wavelength of the desired frequency response so as to take advantage of signal enhancement achieved by reflection from the water surface.

The signal generators are towed behind vessel 11, are attached thereto by lines 12 and are maintained in a spaced relationship by booms 13. Depressors or depth control devices 14 may be used to maintain the signal generators at any present depth. Depressors 14 may comprise merely a weighted line or may comprise any type of paravane conventionally used for this purpose. Signal generators 11 are connected to a power supply and discharging control carried on board the vessel by means of lines 12 which conveniently comprise coaxial cable. Receivers 15 may be of any type suitable for the purpose such as a hydrophone array consisting of multiple, preamplified piezoelectric receiving elements. They are electrically connected, via cable 16, to seismic recording apparatus carried on vessel 11. In a most preferred embodiment, multiple receivers are used in a planar array mutually spaced at the same interval as are the signal generators as is illustrated in FIGS. 1 and 2. It is also advantageous to operate the receivers at a depth equal to one-fourth wavelength of the desired frequency response so as to take advantage of the water surface reflection.

When each signal generator is spaced horizontally one-half wavelength from adjacent sources, as for example three signal generators spaced in an equilateral triangle, then the juncture of wave fronts (which can be considered a new point source) takes place centrally and most of the combined energy is directed downward. At any angular distance from the normal to the plane, the wave fronts will be increasingly out of phase. This results in destructive interference of out-of-phase energy thus decreasing transmission of energy to the side and suppressing the following bubble pulse.

For fixed frequency sources, the array is tuned to the fundamental frequency by selection of the appropriate spacing. For broad-band frequency generators, such as a sparker or similar devices, the array is also responsive to all of the harmonics of the tuned frequency. The contribution of harmonics has the disadvantage of creating side lobes but these lobes can be eliminated in the receiving and recording equipment by selective band pass filtering.

Figure 3:
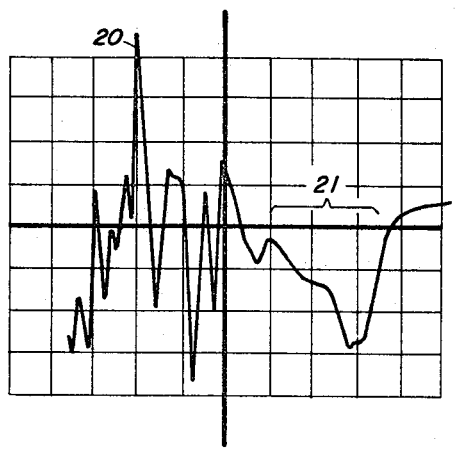
FIG. 3 is a representation of an oscilloscope trace recording the output from a four-source array arranged in the manner shown in FIGS. 1 and 2.
Figure 4:
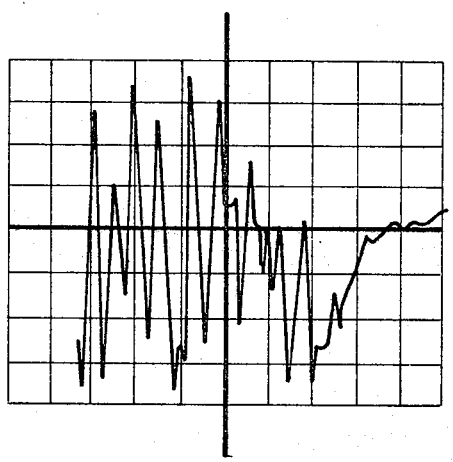
FIG. 4 is a representation of an oscilloscope trace recording the output from a two-source array arranged in accordance with the present invention.
Figure 5:
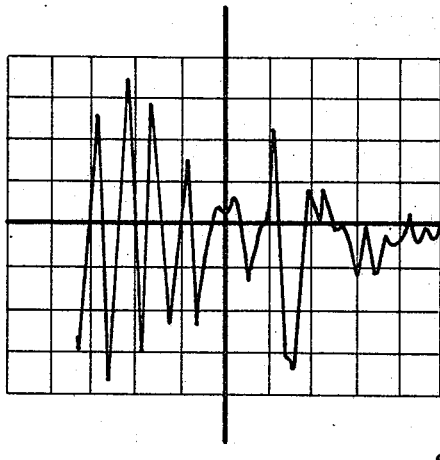
FIG. 5 is a representation of an oscilloscope trace recording the output from a single-source air gun representative of conventional practice.

FIGS. 3, 4 and 5 are representations of oscilloscope traces recording the output from various acoustical sources. In each case, the signals were band passed at 85 to 125 Hz. using a 10-element hydrophone as a receiver. The hydrophone was towed at a depth of approximately 12 m. and the source-to-receiver separation was on the order of 50 m. Water depth in the test area exceeded 600 m., but the recorder traces are not true free-field measurements because the signal represents both the diect arrrival of the pressure wave and its water surface reflection.

FIG. 3 represents the signal produced by a 4-sparker array arranged at nominal ½ wavelength spacing and discharging 5000 w.-sec. of electrical energy. The trace produced by a 2-sparker array, also at nominal ½ wavelength spacing and also discharging 5000 w.-sec., is shown in FIG. 4.

FIG. 5 represents the recorded output of an air gun discharging 1750 p.s.i. from a 10 cu.-in. chamber and is generally representative of acoustic sources conventionally used. Other experimental work indicates that a single electrode discharge source must be operated at energies on the order of 20,000 w.-sec. in order to obtain the same quality of seismic profile as that obtainable using a pneumatic source operating at 1750 to 2000 p.s.i. from a 10 cu.-in. chamber. FIG. 5 then is also generally representative of the acoustic pressure pattern obtained by firing a single electrode at an energy level approximately 4 times that used in FIGS. 3 and 4.

The marked peakedness of the primary pressure pulse 20 of the four-sparker array (FIG. 3) contrasts sharply with the much more rough and erratic wave forms produced either by a two-sparker array or by an air gun. In addition, the four-sparker array displays a greatly subdued bubble pulse 21 as compared to the other systems illustrated.

A planar array of acoustic sources has been found much more highly directional than is a linear array and this embodiment is preferred. However, even a two-source linear array substantially increases the overall acoustic efficiency of the system and decreases the sharpness and signal interference of the bubble pulse.

What is claimed is:
1. A method of marine seismic surveying which comprises downwardly focusing acoustical wave energy and suppressing interference of the bubble pulse with reflections of that downwardly directed energy by employing a plurality of acoustic sources generating energy having an established frequency distribution, each of said acoustic sources being separated from adjacent sources by a distance defined by the equation $n\lambda/2$ wherein $\lambda$ is the wavelength of a dominant frequency within said established frequency distribution and wherein $n$ is an integer having a value of 1 to 4 inclusive and receiving and recording the reflections of said downwardly focused waves.

2. The method of claim 1 wherein at least three acoustic sources are arranged in a planar format and generate substantially equal amounts of acoustic energy having a substantially identical frequency distribution.

3. The method of claim 2 wherein three acoustic sources are arranged in an equilateral triangle and wherein $n$ has a value of 1.

4. The method of claim 2 wherein four acoustic sources are arranged in a square and wherein $n$ has a value of 1.

5. The method of claim 2 wherein said acoustic sources comprise underwater spark discharges producing substantial acoustic energy having a frequency distribution in the range of 50 to 200 Hz.

6. The method in claim 2 wherein said acoustic sources are maintained at a depth of approximately $\lambda/4$.

7. The method of claim 2 wherein the reflections of said waves are received by multiple hydrophones mutually spaced at the same intervals as are said acoustic sources.

8. The method of claim 6 wherein the reflections of said waves are received by multiple hydrophones mutually spaced at the same intervals as are said acoustic sources and wherein said multiple hydrophones are maintained at a depth of approximately $\lambda/4$.

References Cited
UNITED STATES PATENTS

| | | | |
|---|---|---|---|
| 1,919,917 | 7/1933 | Truman | 340—15.5 |
| 2,654,874 | 10/1953 | Press | 340—15.5 |
| 2,906,363 | 9/1959 | Clay | 340—15.5 |
| 3,331,050 | 7/1967 | Kilmer et al. | 340—7 |

RODNEY D. BENNETT, Jr., Primary Examiner

CHARLES E. WANDS, Assistant Examiner

U.S. Cl. X.R.

340—15.5